Aug. 21, 1962

W. W. McMULLEN 3,049,822

SLOPE GRADER ATTACHMENT

Filed Nov. 15, 1960

INVENTOR.
WAYNE W. McMULLEN,
BY

McMorrow, Berman & Davidson
ATTORNEYS.

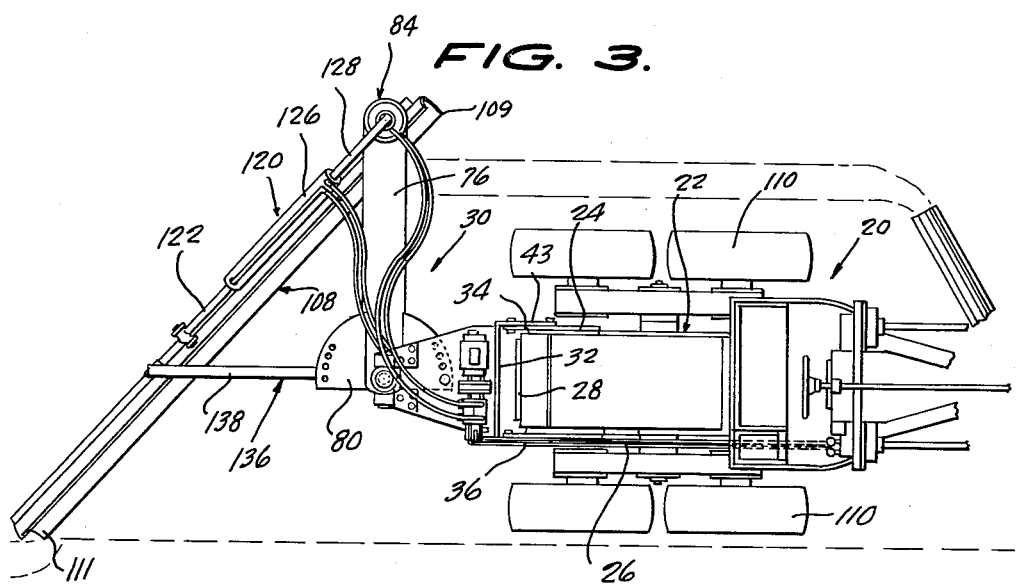
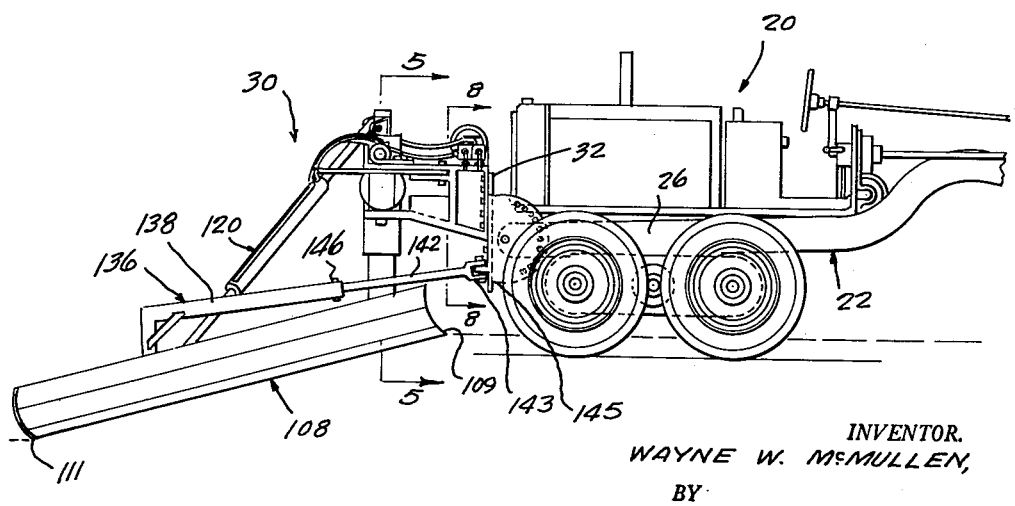

Aug. 21, 1962   W. W. McMULLEN   3,049,822
SLOPE GRADER ATTACHMENT
Filed Nov. 15, 1960   6 Sheets-Sheet 3
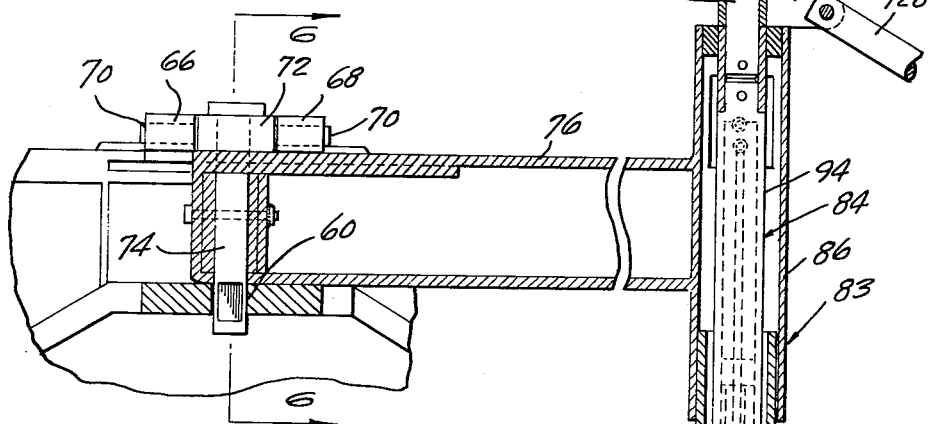
FIG. 5.
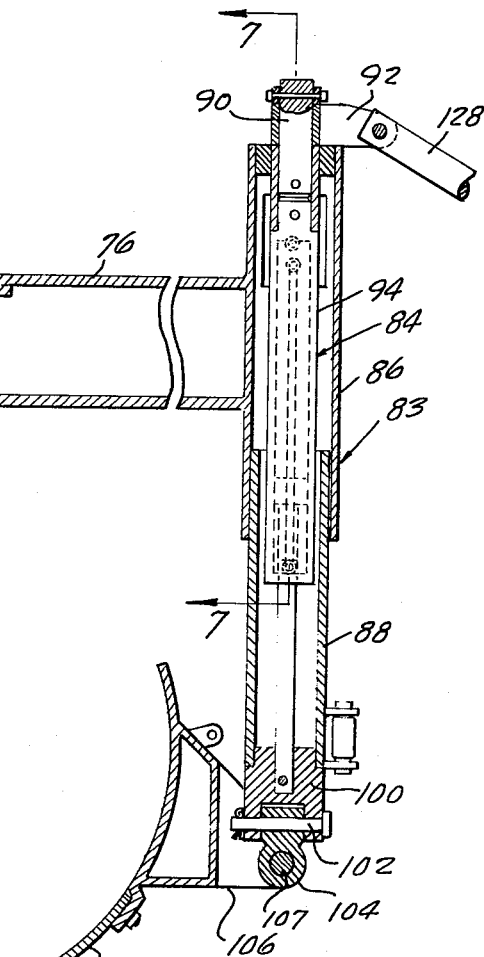
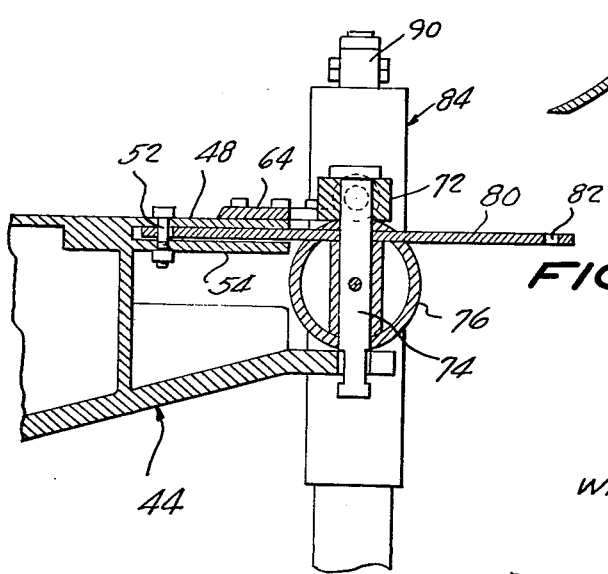
FIG. 6.
INVENTOR.
WAYNE W. McMULLEN,
BY
McMorrow, Berman & Davidson
ATTORNEYS.

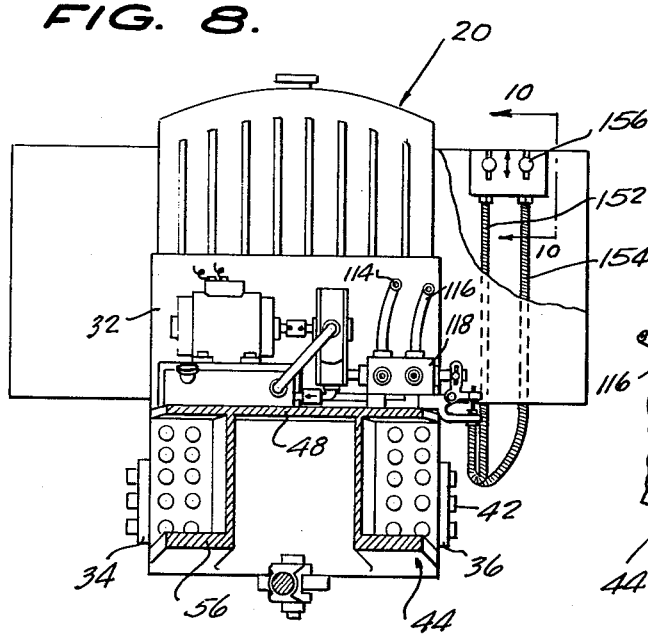
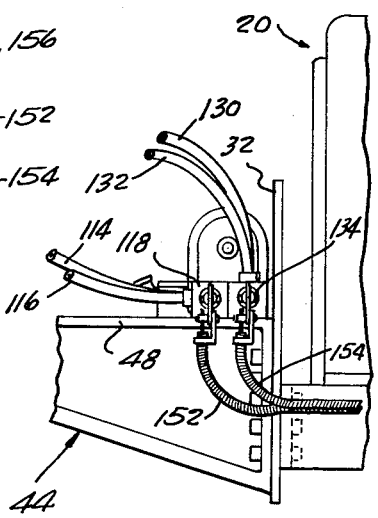
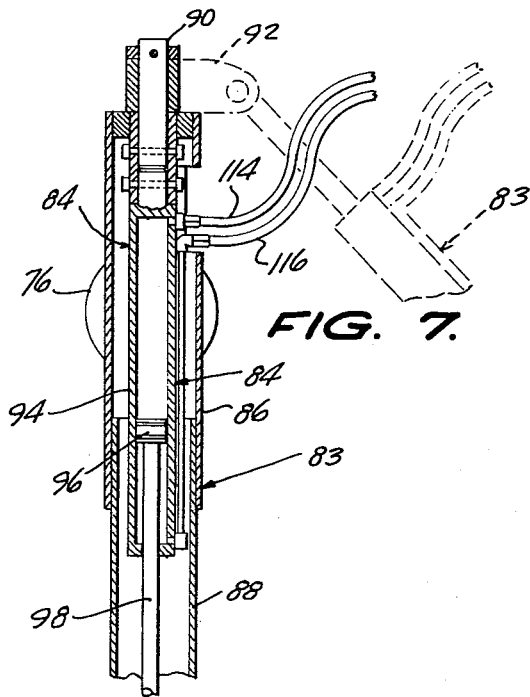
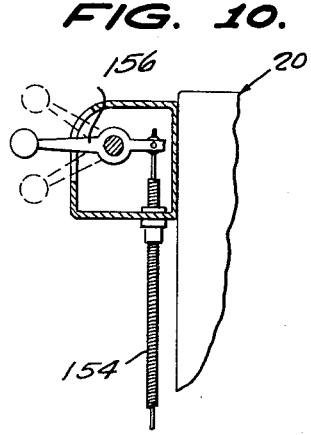

Aug. 21, 1962 W. W. McMULLEN 3,049,822
SLOPE GRADER ATTACHMENT
Filed Nov. 15, 1960 6 Sheets-Sheet 5

INVENTOR.
WAYNE W. McMULLEN,
BY
McMorrow, Berman & Davidson
ATTORNEYS.

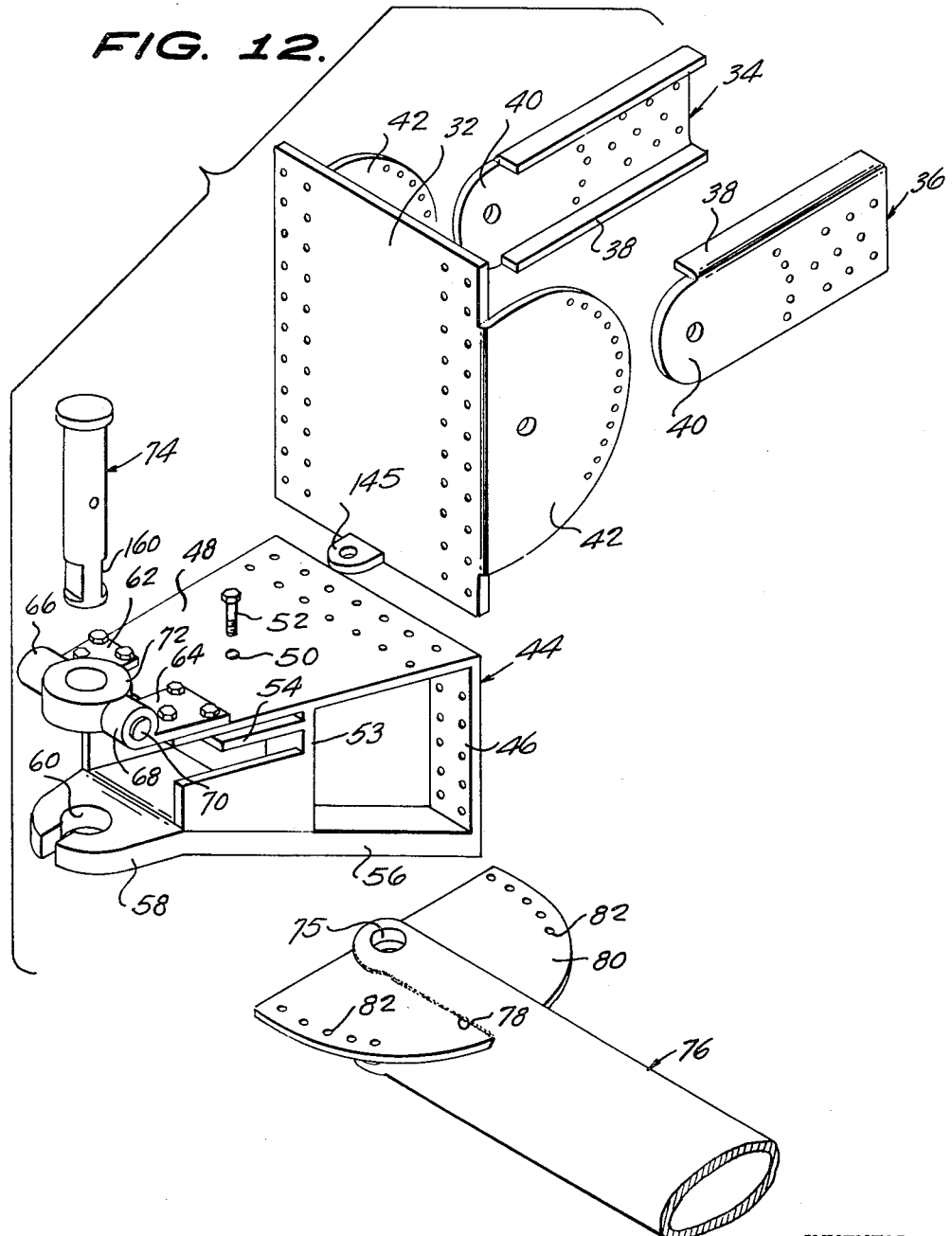

United States Patent Office 3,049,822
Patented Aug. 21, 1962

3,049,822
SLOPE GRADER ATTACHMENT
Wayne W. McMullen, 1002 67th St., Des Moines, Iowa
Filed Nov. 15, 1960, Ser. No. 69,381
5 Claims. (Cl. 37—155)

The present invention relates to road graders generally and in particular to a slope grader attachment for a road grader.

An object of the present invention is to provide a slope grader attachment for a road grader which enables the operator of the road grader to shape the sloping sides of the road by scraping the dirt and gravel and by moving the loosened dirt and gravel either upwardly or downwardly toward or away from the road.

Another object of the present invention is to provide a slope grader attachment for a road grader which lends itself to attachment to the road grader in either of two positions, a position outwardly of one side of the grader, or a position rearwardly of and in substantial tandem spaced relation with respect to the leveling blade or scraper of the grader.

A further object of the present invention is to provide a slope grader attachment for a road grader which may be swung up out of the ground engaging position for travel over a roadway, one which is simple in structure and of sturdy construction, and one which is economically feasible.

These and other objects and advantages of the present invention will be fully apparent from the following description when taken in connection with the annexed drawings, in which:

FIGURE 3 is a plan view of the road grader with the attachment of the present invention shown in position to spread dirt and gravel on the roadway behind the grader, the outer end portion of the blade of the attachment being broken away;

FIGURE 4 is a side elevational view of the assembly shown in FIGURE 3;

FIGURE 5 is a view on an enlarged scale, taken on the line 5—5 of FIGURE 4;

FIGURE 6 is a view taken on the line 6—6 of FIGURE 5;

FIGURE 7 is a view taken on the line 7—7 of FIGURE 5;

FIGURE 8 is a view on an enlarged scale, taken on the line 8—8 of FIGURE 4;

FIGURE 9 is a side elevational view of the assembly shown in FIGURE 8;

FIGURE 10 is a view on an enlarged scale, taken on the line 10—10 of FIGURE 8;

FIGURE 12 is an isometric exploded view of the backing plate, tie means, anchoring element, and blade support arm.

Figure 1:
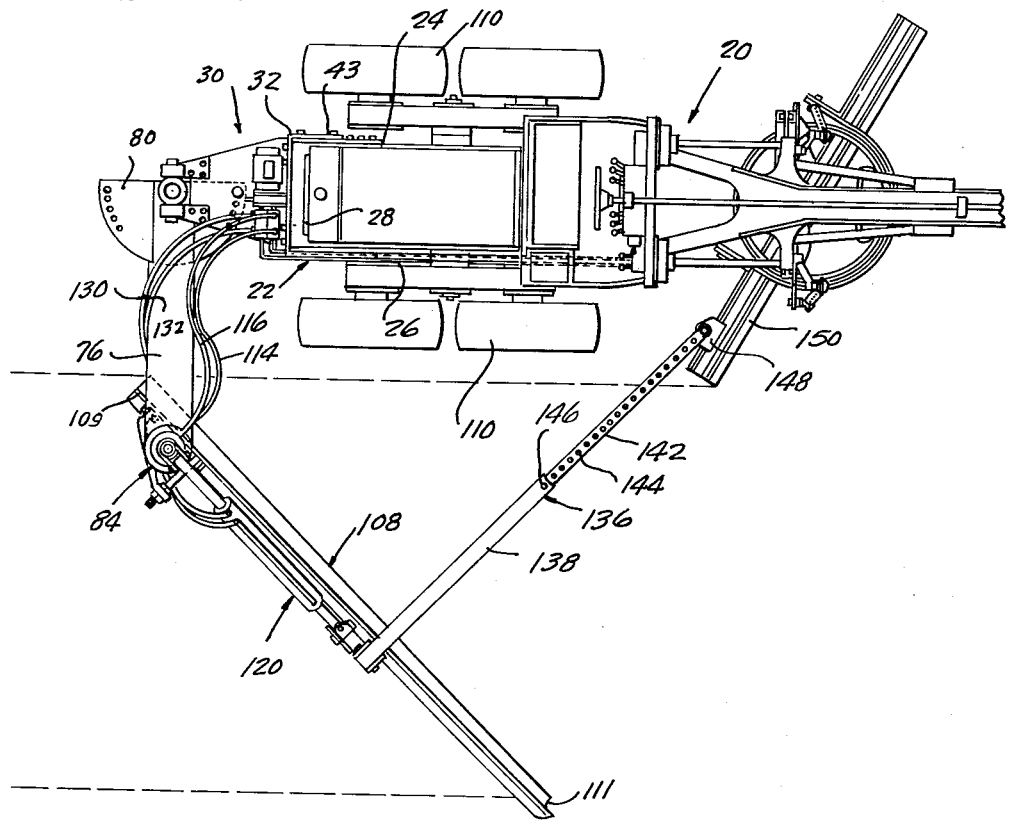
FIGURE 1 is a plan view of a road grader with the slope grader attachment of the present invention installed thereon, the blade of the attachment being in position for scraping dirt and gravel from the slope adjacent one side of the roadway.

Referring in greater detail to the drawings in which like numerals indicate like parts throughout the several views, in FIGURES 1 to 4, is shown a grader 20 having a wheeled frame 22 including side members 24 and 26 and a rear cross member 28 connecting the rear ends of the side members 24 and 26 together.

The slope grader attachment of the present invention is designated generally by the reference numeral 30 and it comprises an upstanding backing plate 32 positioned so as to extend along and parallel to the rear cross member 28.

Tie means, embodying rigid channel-shaped straps 34 and 36, extend along the rear end portions of the frame side members 24 and 26, respectively, of the frame 22 and form the means for securing the backing plate 32 to the adjacent side members 24 and 26 of the frame 22, as shown in FIGURES 4 and 12.

The straps 34 and 36 each have flanges 38 and a web 40 connecting the flanges 38 together. The backing plate 32 has ears 42 which are pivotally connected to the rounded end portions of the webs 40 by conventional means such as bolts 43, as shown in FIGURE 1.

An anchoring element 44 is positioned in tandem relation with respect to the backing plate 32 and is supported from the backing plate 32.

As shown most clearly in FIGURE 12, the anchoring element 44 consists of an open box structure shaped to a truncated pyramid form and disposed horizontally with the base of the pyramid attachable by bolts to the backing plate 32, the base of the pyramid consisting of a pair of laterally spaced vertically disposed straps 46.

The anchoring element 44 has its upper face plate 48 provided with a hole 50 through which extends a shear pin 52. A plate element 53 extends vertically through the anchoring element 44 from one side to the other and carries on one face in parallel relation to the plate 48 a horizontally disposed plate element 54 which is also provided with a hole for the shear pin 52.

The lower plate portion of the element 44 is Y-shaped with legs 56 and a stem portion 58 provided with a slotted hitch opening 60.

A pair of plates 62 and 64 are bolted to the plate 48 remote from the straps 46 and carry on their free ends sleeves 66 and 68, respectively, which serve as trunnions for a pair of stub shafts 70 which project from diametrically opposed points of a hitch ring 72.

Figure 11:
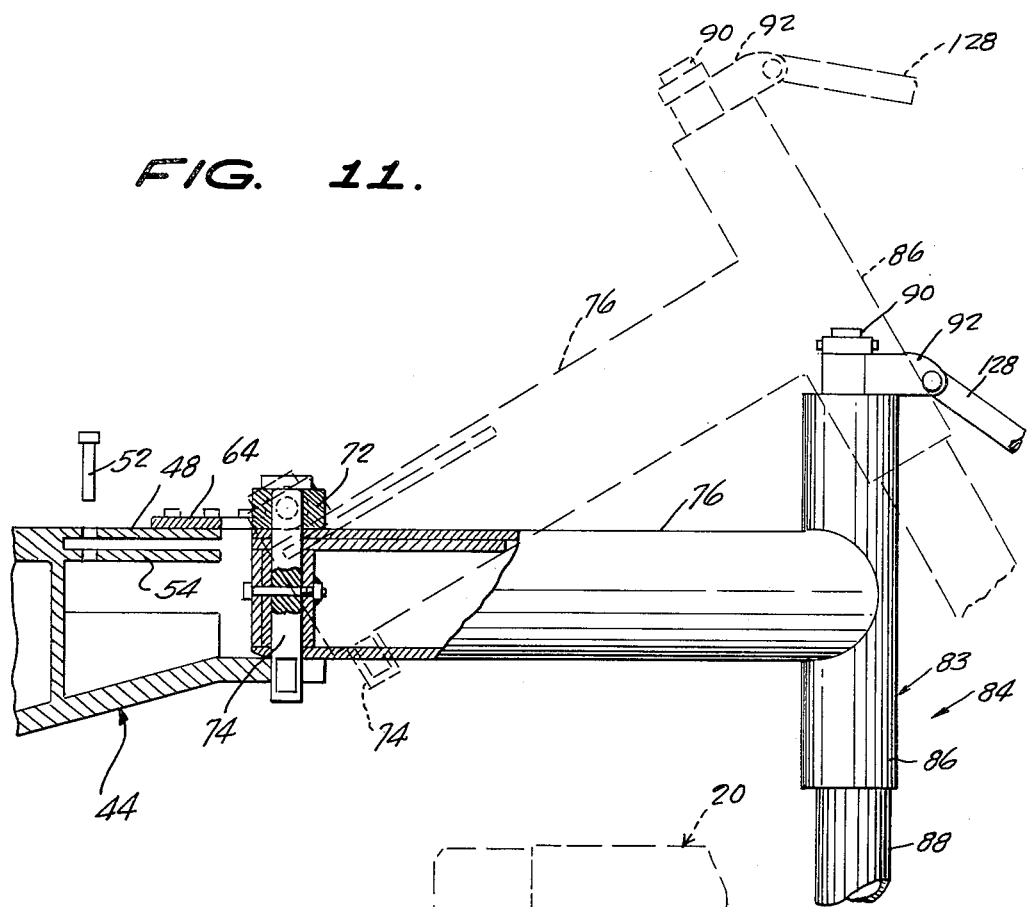
FIGURE 11 is a view on an enlarged scale of the blade support arm, the tilting movement of the blade support arm when the blade is lifted for travel over a roadway being shown in dotted lines.
Figure 13:
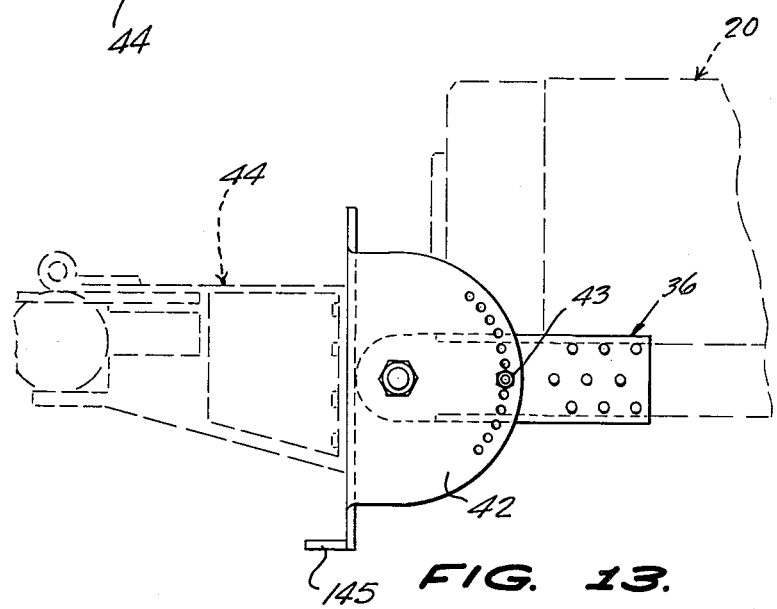
FIGURE 13 is a side elevational view of the backing plate and tie means.

The sleeves 68 support the hitch ring 72 for tilting movement from the substantially horizontal position shown in FIGURE 12 to a tilted dotted line position shown in FIGURE 11.

A hitch pin 74 is insertable through the ring 72 and the hitch hole 60 for purposes which will be hereinafter described.

A support arm 76 is arranged transversely of the anchoring element 44 and has one end connected to the anchoring element 44 for pivotal movement about a vertical axis. The arm 76 is provided with a longitudinally arranged slot 78 through which extends a semicircular plate 80 welded to the adjacent parts of the arm 76, and inwardly of the perimeter of the plate 80 are spaced holes 82 for selectively positioning the arm 76 in angular relation with respect to the anchoring element 44 on either side of the latter. The plate 80 enters the slot formed by the plate 48 and plate element 54 and the shear pin 52 is received through the holes 50 in the plate 48, through the corresponding hole in the plate element 54, and through a selected one of the holes 82 in the plate 80.

The pin 74 is receivable in a hole 75 in the arm 76. The pin 74 connects the arm 76 to the anchoring means 44 for swinging movement about the pin 74 as a vertical axis.

The other end of the arm 76 carries thereon a hollow post designated generally by the reference numeral 83. The other end of the arm 76 is outwardly of the frame side member 26 and is spaced therefrom. The post 83 carries an elevating and lowering means designated generally by the reference numeral 84 and illustrated in detail in FIGURES 5 and 7.

The elevating and lowering means 84 consists in the post 83 formed by an outer sleeve 86 welded to the support arm 76. A lower sleeve 88 is telescopically arranged within the upper sleeve 86, as shown in FIGURE 5. Projecting outwardly of the upper end of the outer sleeve 86 is a support element 90 from which projects a pair of ears 92, the use of which will be explained later. The lower end portion of the element 90 is within the sleeve 86 and is fixedly secured to the upper end of a vertically disposed hydraulic cylinder 94 having a piston 96 slidable therein. A piston rod 98 has its upper end connected to the piston 96 and projects from the lower end of the hydraulic cylinder 94. The piston rod 98 has its lower end fixedly secured to a plug element 100 extending into and fixedly secured to the lower end of the inner sleeve 88. Rockably supported by a pin 102 extending through the plug element 100 is a connector element 104.

An upstanding deflecting blade 108 has a rearwardly projecting bracket 106 on its inner end 109. The bracket 106 is pivotally connected by a pin 107 to the connector element 104. The pin 107, bracket 106, and connector element 104 constitute the means connecting the blade inner end 109 to the elevating and lowering means 84. The blade 108 is positioned, in FIGURES 1 and 2, so that the inner end 109 is adjacent the elevating and lowering means 84 and the outer end 111 is outwardly of the one side member 26 of the frame 22, as shown in FIGURE 1.

The blade 108 is also positionable, as shown in FIGURES 3 and 4, so that the inner end 109 is rearwardly of and adjacent the side member 24 and the outer end 111 is rearwardly of and remote from the side member 26.

When the blade 108 is in the last-mentioned position, its inner end 109 is on one side of the other side member 24 and exteriorly of the adjacent wheel 110 of the grader 20.

The upper and lower ends of the hydraulic cylinder 94 are connected by conduits 114 and 116, respectively, to a conventional valve 118 mounted upon the plate 48 of the anchoring element 44 adjacent the plate 32, as shown in FIGURE 9.

The present invention also provides a hydraulic cylinder assembly 120. The free end of the actuating arm 122 of the assembly 120 is pivotally connected to a bracket 124 which projects upwardly from the rear face of the blade 108, as shown most clearly in FIGURE 2. The cylinder 126 of the assembly 120 is mounted upon the one end of a bar 128 which has its other end pivotally connected to the pair of ears 92 on the upper end of the support element 90.

Conduits 130 and 132 connect the upper and lower ends of the hydraulic cylinder 126 to a second valve 134 mounted beside the valve 118 on the plate 48.

An extensible and retractable bar means is provided for securing the blade 108 to the grader frame 22 when the blade 108 is disposed in either of the above described positions. This extensible and retractable bar means includes, as shown in FIGURE 1, an L-shaped tubular member 136 having its long leg 138 disposed substantially horizontally and its short leg 140 disposed vertically with the free end of the short leg 140 pivotally connected to a bracket 112 on the rear face of the blade 108 when the blade 108 is in the position extending outwardly from the side member 26. The free end of the long leg 138 of the tubular member 136 is adjustably connected to a bar 142 telescopically arranged with respect to the long leg 138 of the tubular member 136. The bar 142 is provided with a series of spaced holes, as at 144 in FIGURE 1, selectively receiving a bolt 146 extending through a hole provided in the free end of the long leg 138 of the member 136.

The free end of the bar 142 carries a clevis 143 which is pivotally connected to a bracket 148 provided on the leveling blade 150 of the grader 20. It is to be understood that the free end of the bar 142 may be attached to the frame 22 of the grader 20 at any place convenient.

When the blade 108 is in the position shown in FIGURES 3 and 4, the clevis 143 on the free end of the bar 142 is pivotally connected to an eye formation 145 provided on the lower end of the plate 32, as shown in FIGURES 4 and 12.

With reference to FIGURES 8 to 10, the valves 118 and 134 are manually controlled by means of flexible cable assemblies 152 and 154, respectively, having their ends operatively connected to the valves 118 and 134 and to manually operable levers, such as the ones shown in FIGURE 10 and designated by the numeral 56.

In operation, the blade 108 may be positioned to one side of the grader 20, as shown in FIGURE 1, or it may be positioned to the other side of the grader from that shown in FIGURE 1. If desired, the blade may be positioned rearwardly of the grader 20, as shown in FIGURES 3 and 4. When it is desired to lift the blade 108 for traveling over a road surface, from the position shown in FIGURES 3 and 4, the shear pin 52 is pulled and the arm 76 is swung to the position shown in FIGURE 11 in full lines.

No means is provided by the present invention for lifting the blade 108 to the elevated out of use position. This may be accomplished with the aid of a bulldozer blade, crane, or other elevating mechanism.

Figure 2:
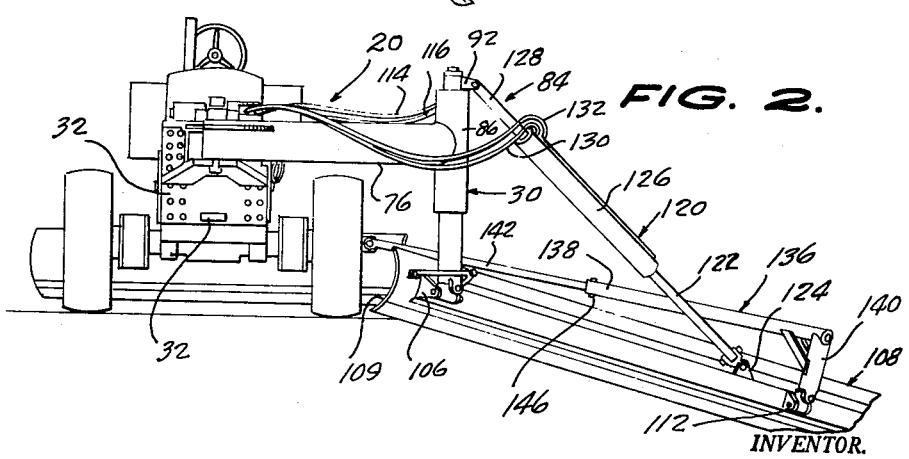
FIGURE 2 is a rear elevational view of the assembly shown in FIGURE 1.

When it is desired to shift the blade 108 from the position shown in FIGURES 1 and 2 to the position shown in FIGURES 3 and 4, the inner end 109 of the blade 108 is lowered so as to engage the ground. The bar 142 is next disconnected from the scraper blade 150 and the pin 82 is pulled from the plate 80. The scraper 20 is then moved ahead a distance sufficient to cause the blade 108 to be dragged to the rear of the scraper which is then moved rearwardly and to one side of the blade inner end 109 to the desired position.

It will be apparent from FIGURE 12 that the pin 74 has cutaway portions at 160 which permit the pin 74 to be shifted out of the hole 60 when the arm 76 is longitudinally arranged with respect to the anchoring element 44. A motor 160 drives a pump 162 to supply fluid under pressure to the cylinders 94 and 126.

The use of the blade 108 will be fully understood to persons in charge of grading roadways and the sloping banks on either side of a roadway and the hydraulic cylinder assemblies attached to the blade at either end thereof permit shifting of the blade to any angle desired relative to the slope of the ground adjacent such a roadway.

While only preferred forms of the invention are shown and described, other embodiments of the invention are contemplated and numerous changes and modifications may be made in the invention described without departing from the spirit of the invention as set forth in the appended claims.

What is claimed is:

1. The combination with a wheeled frame including a pair of laterally spaced side members and a rear cross member connecting the rear ends of said side members together, of a slope grader attachment comprising an upstanding backing plate positioned so as to extend along and parallel to said cross member, tie means embodying a rigid strap extending along the rear end portion of each of said side members and detachably secured to the adjacent side member and having one end pivotally connected to said backing plate securing said plate to said side members, an anchoring element positioned in tandem relation with respect to said backing plate and supported from said backing plate, an arm arranged transversely of said anchoring element and having one end pivotally connected to said anchoring element and having the other end to one side of and spaced outwardly of one or the other of said side members, an elevating and lowering means carried by the other end of said arm, an upstanding deflecting blade having an inner end and an outer end positionable so that the inner end is adjacent said elevating and lowering means with the outer end outwardly of said one side member or so that the inner end is rearwardly of and remote from said one side member with the outer end rearwardly and adjacent to the other of said side members, means on said blade connecting said blade to said elevating and lowering means for movement therewith when said blade is disposed in either of the aforesaid positions, and an extensible and retractable bar means for operatively securing said blade to said frame when said blade is disposed in either of the aforesaid positions.

2. The combination with a wheeled frame including a pair of laterally spaced side members and a rear cross member connecting the rear ends of said side members together, of a slope grader attachment comprising an upstanding backing plate positioned so as to extend along and parallel to said cross member, tie means securing said plate to said side members, an anchoring element positioned in tandem relation with respect to said backing plate and supported from said backing plate, an arm arranged transversely of said anchoring element and having one end pivotally connected to said anchoring element and having the other end to one side of and spaced outwardly of one or the other of said side members, an elevating and lowering means carried by the other end of said arm, an upstanding deflecting blade having an inner end and an outer end positionable so that the inner end is adjacent said elevating and lowering means with the outer end outwardly of said one side member or so that the inner end is rearwardly of and remote from said one side member with the outer end rearwardly and adjacent to the other of said side members, means on said blade connecting said blade to said elevating and lowering means for movement therewith when said blade is disposed in either of the aforesaid positions, an extensible and retractable bar means for operatively securing said blade to said frame when said blade is disposed in either of the aforesaid positions, and drive means on said anchoring element and operatively connected to said elevating and lowering means for effecting the operation of the latter.

3. The combination with a wheeled frame including a pair of laterally spaced side members and a rear cross member connecting the rear ends of said side members together, of a slope grader attachment comprising an upstanding backing plate positioned so as to extend along and parallel to said cross member, a pair of laterally spaced ears projecting from said backing plate, tie means embodying a rigid strap extending along the rear end portion of each of said side members and detachably secured to the adjacent side member and having one end pivotally connected to the adjacent ear of said backing plate securing said plate to said side members, an anchoring element positioned in tandem relation with respect to said backing plate and supported from said backing plate, an arm arranged transversely of said anchoring element and having one end pivotally connected to said anchoring element and having the other end to one side of and spaced outwardly of one or the other of said side members, an elevating and lowering means carried by the other end of said arm, an upstanding deflecting blade having an inner end and an outer end positionable so that the inner end is adjacent said elevating and lowering means with the outer end outwardly of said one side member or so that the inner end is rearwardly of and remote from said one side member with the outer end rearwardly and adjacent to the other of said side members, means on said blade connecting said blade to said elevating and lowering means for movement therewith when said blade is disposed in either of the aforesaid positions, and an extensible and retractable bar means for operatively securing said blade to said frame when said blade is disposed in either of the aforesaid positions.

4. The combination with a wheeled frame including a pair of laterally spaced side members and a rear cross member connecting the rear ends of said side members together, of a slope grader attachment comprising an upstanding backing plate positioned so as to extend along and parallel to said cross member, tie means embodying a rigid strap extending along the rear end portion of each of said side members and detachably secured to the adjacent side member and having one end pivotally connected to said backing plate securing said plate to said side members, an anchoring element positioned in tandem relation with respect to said backing plate and supported from said backing plate, an arm arranged transversely of said anchoring element and having one end pivotally connected to said anchoring element and having the other end to one side of and spaced outwardly of one or the other of said side members, a post rising from the other end of said arm, an elevating and lowering means carried by said post, an upstanding deflecting blade having an inner end and an outer end positionable so that the inner end is adjacent said elevating and lowering means with the outer end outwardly of said one side member or so that the inner end is rearwardly of and remote from said one side member with the outer end rearwardly and adjacent to the other of said side members, means on said blade connecting said blade to said elevating and lowering means for movement therewith when said blade is disposed in either of the aforesaid positions, and an extensible and retractable bar means for operatively securing said blade to said frame when said blade is disposed in either of the aforesaid positions.

5. The combination with a wheeled frame including a pair of laterally spaced side members and a rear cross member connecting the rear ends of said side members together, of a slope grader attachment comprising an upstanding backing plate positioned so as to extend along and parallel to said cross member, tie means securing said plate to said side members, an anchoring element positioned in tandem relation with respect to said backing plate and supported from said backing plate, an arm arranged transversely of said anchoring element and having one end pivotally connected to said anchoring element and having the other end to one side of and spaced outwardly of one or the other of said side members, a post rising from the other end of said arm, an elevating and lowering means carried by said post, an upstanding deflecting blade having an inner end and an outer end positionable so that the inner end is adjacent said elevating and lowering means with the outer end outwardly of said one side member or so that the inner end is rearwardly of and remote from said one side member with the outer end rearwardly and adjacent to the other of said side members, means on said blade connecting said blade to said elevating and lowering means for movement therewith when said blade is disposed in either of the aforesaid positions, an extensible and retractable bar means for operatively securing said blade to said frame when said blade is disposed in either of the aforesaid positions, and drive means on said anchoring element and operatively connected to said elevating and lowering means for effecting the operation of the latter.

References Cited in the file of this patent

UNITED STATES PATENTS

| | | |
|---|---|---|
| 1,153,508 | Magruder | Sept. 14, 1915 |
| 2,491,797 | Burnes et al. | Dec. 20, 1949 |
| 2,822,628 | Arps et al. | Feb. 11, 1958 |
| 2,847,772 | McMullen | Aug. 19, 1958 |
| 2,876,564 | Briscoe | Mar. 10, 1959 |